(No Model.)

W. T. DOREMUS.
CHECK, DRAFT, OR OTHER MONEY ORDER OR INSTRUMENT.

No. 472,864. Patented Apr. 12, 1892.

WITNESSES:
Chas. Niola
C. Sedgwick

INVENTOR:
W. T. Doremus
BY Munn & Co.
ATTORNEYS

THE NORRIS PETERS CO., PHOTO-LITHO., WASHINGTON, D. C.

UNITED STATES PATENT OFFICE.

WILLIAM T. DOREMUS, OF FLATBUSH, NEW YORK.

CHECK, DRAFT, OR OTHER MONEY ORDER OR INSTRUMENT.

SPECIFICATION forming part of Letters Patent No. 472,864, dated April 12, 1892.

Application filed December 31, 1891. Serial No. 416,655. (No model.)

*To all whom it may concern:*

Be it known that I, WILLIAM T. DOREMUS, of Flatbush, in the county of Kings and State of New York, have invented a new and Improved Check, Draft, or other Money Order or Instrument, of which the following is a full, clear, and exact description.

My invention relates to improvements in checks, drafts, or other money orders or instruments in which a sum of money is directed to be paid and requires signature of a person, and the instrument may also be used for indicating the amount or quantity of something other than money.

The invention is an improvement on the blank draft, check, or other money order or instrument for which Letters Patent of the United States No. 376,949 were issued to me January 24, 1888; and the object of the invention in this case, as in the former case, is to prevent the changing, altering, or raising of the check, draft, or other instrument without detection.

As in the previous case, the invention relates to improvements in blank checks, drafts, or similar instruments in which spaces, numerals, and words are arranged so that when the instrument is properly filled out it cannot be changed or altered, and the spaces, numerals, and words may be arranged in duplicate, so that one set of spaces, numerals, or words will act as a check on the other and make alteration impossible. These features were shown to a certain extent in the former patent above referred to, and the particular object of this invention is to simplify the arrangement of the spaces, numerals, and words on the instrument shown in the former patent, so that the instrument may be easily, quickly, and correctly filled up. In the instrument shown in the former patent this required considerable practice; but as shown in the present case any one capable of filling out any check or similar instrument can readily fill out this.

To this end my invention consists in a blank check, draft, money-order, or similar instrument having spaces, numerals, and words arranged thereon in a manner to prevent the altering or raising of the instrument, said arrangement being substantially as hereinafter described and claimed.

Reference is to be had to the accompanying drawing, forming a part of this specification, in which the figure is a face view of a bank-check embodying my invention and filled out in a manner to prevent alteration or raising.

The check 10 is provided at top and bottom, as shown at 11, with directions telling how it should be filled out, although these directions may be omitted, if desired. The check has the usual blank or space 10$^a$ for the name of the bank, which space may be left blank, so that it may be written in when the check is made, or the name of the bank or payer may be printed in in the usual manner. The check has also the date-blank 12, the usual number-blank 13, the customary blank 14, in which the name of the payee is written, and the blank 15, in which the amount of the check is placed in numerals, the space or blank 15 having, also, the usual sign of United States money, ($.) It will be seen that these blank spaces may be made in any usual or convenient manner upon the check without altering its character or affecting the invention.

The check is provided near its lower portion with parallel longitudinal lines 16, forming spaces, above which the amount of the check may be written in words and in which the name of the maker of the check may be written, and these spaces below the upper space correspond in number to the highest number of numerical denominations for which the check can be written—that is to say, if the check is to be used for numbers containing not more than five figures there will be five spaces, and the check may be used for any number containing less than five figures; but if the check is for greater numbers it may have more or less spaces, as desired. The upper of the spaces 16 is traversed near one end by oblique lines 17, which extend upward above the spaces and which enable the location of the signature and the written amount to be easily placed in relation to the numbers in the spaces, as hereinafter described, and these oblique lines merge at their lower ends in lines 17$^a$, which cross the lower of the spaces 16 and are perpendicular to the lines forming such spaces. On one of the upper lines 16 and near one end of the check are numbers, from 0 to 9, arranged in numerical order and expressed both in numerals and in written words, although they may be expressed in either alone, if desired. These numbers are produced in several cross-spaces formed by the intersection of the lines forming the spaces 16 and the oblique lines 17, and at one end of the row of numbers are the words "How many," which remind all parties to the check that the words on the check must be placed in proper position in relation to the numbers. At the end of the row of numbers are the words "No $. Fractions only," so that when the check is used for amounts less than a dollar the written words expressive of the amount are written above the words "No $. Fractions only," and the signature beneath, so that when the check is torn off, as hereinafter described, it will be evident that it must be for a sum less than one dollar. These words and numbers are produced in one of the spaces 16; but they may be produced in two or more thereof, if desired.

On the margin, preferably at one end of the check, is a stub-like portion 18, on which is produced, in transverse lines and in regular order, notation-indicating characters, these being also produced in duplicate—as, for instance, "For units, or one figure in the sum," "For tens or two figures in the sum," &c., and by reference to the drawing it will be seen that the notation-indicating characters are carried up to tens of thousands, or five figures in the sum; but it will be understood that these characters may be arranged in less numbers and may be made to extend upward or downward to any desired extent.

Arranged transversely near one end of the check and beneath the notation-indicating characters are the words "Omitting fractions only," the word "omitting" being in one line and the words "fractions only" in another, and when the check is used for expressing only fractions of a dollar it is torn so as to leave the words "fractions only" on the check; but when the check is for more than a dollar the words "Omitting fractions only" will be on it, and the payer will understand that fractions are not to be indicated, in the manner hereinafter described.

In filling out the check everything is done, in effect, in duplicate, although it may be done by writing the usual amount of matter or a little more than the usual amount—that is to say, the words indicating the amount of money to be paid are written in substantially the usual way, as described below, and the signature of the maker is written so that it also expresses within certain limits the amount of the check, or by repeating the signature it may be made to express the exact amount of the check except the fractions. For instance, as shown in the drawing, the check is written for seventy-five dollars. In this case the figures "75" are produced after the dollar-sign in the space 15 in the usual way, the name of the payee is written in the customary place, and the amount of the check is written in words above the upper space 16, the amount being written so that the first letter thereof will come over the numeral expressive of the sum of the highest denomination of the check. In this case the particular numeral is "7," and in writing the words "seventy-five" the word "seventy" is begun directly above the figure "7" in the check.

When the maker signs his name, he signs it in the first space beneath the row of numerals and places the first letter of his name directly beneath the numeral expressing the sum of the highest denomination expressed, which in this case is "7," and his signature will thus also indicate the highest denomination of the check. The space 16 immediately beneath the row of figures is expressive of the highest denomination written in the sum, the next space of the next lower denomination to that expressed, and so on until all the denominations written are indicated by corresponding spaces, if desired, and these additional spaces may be used for repeating the signature or not, at the option of the maker of the check. If the check is made to express by the signatures the exact amount payable, the signature is repeated in the next space beneath the first signature and the first letter of the repeated signature is written beneath the numeral expressive of the sum of the next lower denomination, which in the case illustrated is five, and it is obvious that this system may, if desired, be carried out to any extent, according to the number of figures in the total sum of the check. If the check is for seventy-five dollars, as above described, the body of the check is then torn off transversely on the line 19, thus leaving the notation characters indicative of the highest order of a check, "For tens, or two figures in the sum," at the end of the check, and this will indicate that the highest numeral in the check is expressive of tens. It will thus be seen that to alter the check it will be necessary to change the figures in the space 15, to change the written amount of the check, and also to preserve the proper relative positions of the written amount, the signature, and the numerals as written longitudinally on the face of the check, and if a person succeeded in doing this he would still be frustrated in his attempt to alter the check, as the wording written transversely on the end of the check would indicate the denomination of the check, and it will thus be seen that it would be impossible to alter a check of the above character without detection. It is not usually necessary to guard against raising the second or third figure of a check, as the alterer of the figure in this case would run the risk of losing the whole amount of the check for the sake of making a comparatively small sum; but this may be guarded against by repeating the signature in the manner described, which manner of writing the signature makes the signature correspond to the number of denominations expressed in the amount, as well as to indicate how many of each denomination is expressed.

If a check were to be made to express hundreds of dollars upon its face, the first letter of the written amount of the check would be produced above the numeral indicating the number of hundreds in the check, the maker would sign his name beneath the same hundreds-numeral in the first space 16 below the line of numerals consecutively expressed, and the check, instead of being torn off at the line 19, would be torn off at the line 20, thus leaving the words "For hundreds, or three figures in the sum," upon the end of the check, which words would indicate that the check was for not more than a certain number of hundreds of dollars and less denominations.

The object in having the words "For units, tens, hundreds," &c., and also the words "one, two, three," &c., "figures in the sum," is to guard against fraud, as described, and also to provide against any possible mistake, as it sometimes happens that a person who would readily understand what was meant by "three" or "four figures in the sum" would not understand what was meant by the words "For hundreds" or "For thousands;" but by producing the characters in duplicate, as described, any one may understand what is meant, and the check may be easily filled up and torn off in the correct manner.
Any instrument indicating that money is to be paid may be made in the manner above described, and it will be understood that orders for corn, wheat, lumber, or any other commodity may be arranged in exactly the same way, except that the amounts to be delivered will be expressed in something other than dollars. Blank receipts and requisitions may likewise be made in substantially the manner described, and certificates of stock may be filled up in the same way, and altering or raising thus prevented.

Having thus fully described my invention, I claim as new and desire to secure by Letters Patent—
1. A blank check, draft, money-order, or similar instrument having on its face longitudinal spaces or lines with consecutive numbers in a portion of them, and oblique lines extending between the numbers and merging in transverse cross-lines which intersect the longitudinal lines substantially at right angles, substantially as described.

2. A blank check, draft, money-order, or similar instrument having longitudinal lines or spaces upon its face with consecutive numbers produced in numerals and words near one end of the lines or spaces, and transverse lines or spaces near one end of the check, having notation characters produced in duplicate thereupon, substantially as described.

3. A blank check, draft, money-order, or similar instrument having longitudinal lines or spaces upon its face with words and consecutive numbers produced therein near one end, oblique lines intersecting the longitudinal lines between the numbers and merging in perpendicular lines which cross the longitudinal lines, and transverse lines or spaces near one end of the check, having notation-indicating characters produced in duplicate thereupon, substantially as described.

4. A blank check, draft, money-order, or similar instrument having on its face longitudinal spaces or lines with consecutive numbers therein near one end, notation-indicating characters produced in transverse lines and regular mathematical order at one end of the check, and the words "Omitting fractions only" or their equivalent produced in two lines between the notation-indicating characters and the body of the check, substantially as described.

5. A blank check, draft, money-order, or similar instrument having longitudinal spaces or lines upon its face with words and consecutive numbers therein near one end and notation-indicating characters produced in transverse lines and regular order at one end of the instrument, the number of longitudinal spaces beneath the consecutive numbers and the number of denominations expressed by the notation-indicating characters coinciding, substantially as described, and for the purpose specified.

WILLIAM T. DOREMUS.

Witnesses:
   WARREN B. HUTCHINSON,
   C. SEDGWICK.